United States Patent
Krueger

[11] 3,839,271
[45] Oct. 1, 1974

[54] PRIMER COMPOSITIONS COMPRISING ZINC CHROMATE, STABILIZERS AND ACRYLATE POLYMERS CONTAINING OXAZOLIDINE UNITS

[75] Inventor: Achim R. Krueger, Cherry Hill, N.J.

[73] Assignee: E. I. du Pont de Nemours and Company, Wilmington, Del.

[22] Filed: Dec. 7, 1973

[21] Appl. No.: 422,704

Related U.S. Application Data

[63] Continuation-in-part of Ser. Nos. 229,518, Feb. 25, 1972, and Ser. No. , , which is a continuation-in-part of Ser. No. 98,132, Dec. 14, 1970, abandoned.

[52] U.S. Cl............ 260/41 B, 117/75, 260/32.8 N, 260/33.6 UA
[51] Int. Cl. ............................................ C08f 45/04
[58] Field of Search...................... 117/75; 260/41 B

[56] References Cited
UNITED STATES PATENTS

| | | | |
|---|---|---|---|
| 2,949,445 | 8/1960 | Blake | 260/86.1 |
| 3,037,006 | 5/1962 | Hankins | 260/80.72 |
| 3,053,692 | 9/1962 | Pocock | 117/75 |

FOREIGN PATENTS OR APPLICATIONS

| | | |
|---|---|---|
| 871,296 | 5/1958 | Great Britain |

*Primary Examiner*—Allan Lieberman
*Assistant Examiner*—P. R. Michl

[57] ABSTRACT

Acrylic and methacrylic primer compositions are provided which comprise zinc chromate and a film-forming acrylic polymer or methacrylic polymer with oxazolidines as adhesion promoting monomeric units and a stabilizer of the structure

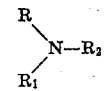

wherein
R and $R_1$ are each selected from the group consisting of -H, alkyl of one to four carbons and alkanol of one to four carbons, and
$R_2$ is selected from the group consisting of -H, -OH, alkyl of one to eight carbons, alkanol of one to four carbons, $-(CH_2)_n HN_2$ where $n$ is 2 to 6 and $-(CH_2CH_2NH)_m CH_2CH_2NH_2$ where $m$ is 1 to 3.

The stabilizer improves viscosity stability, pigment dispersion or both.

11 Claims, No Drawings

PRIMER COMPOSITIONS COMPRISING ZINC CHROMATE, STABILIZERS AND ACRYLATE POLYMERS CONTAINING OXAZOLIDINE UNITS

RELATED APPLICATIONS

This is a continuation-in-part of copending application U.S. Ser. No. 229,518, filed Feb. 25, 1972, which in turn is a continuation-in-part of U.S. Ser. No. 98,132, filed Dec. 14, 1970, now abandoned.

BACKGROUND OF THE INVENTION

It is known that alkyl acrylate and methacrylate monomers can be trans-esterified with N-hydroxyalkyloxazolidine compounds, specifically (2-methacryloxyethyl)-2,2-spirocyclohexyl oxazolidine, in a heated reaction vessel in the presence of a suitable catalyst to produce N-acryloxyalkyloxazolidine monomers. This reaction is described in U.S. Pat. No. 3,037,006, issued May 29, 1962, to Hankins et al. Since the acyl portions of the molecules contain a double bond, the resulting monomers can be formed into linear polymers and copolymers by a typical vinyl addition process. Such copolymers make excellent film formers and excellent primers when combined with zinc chromate. However, these polymers with acryloxyalkyloxazolidine monomeric units have poor storage stability when combined with zinc chromate. The N-hydroxyalkyloxazolidine compounds have a tendency to prematurely react with the zinc chromate thereby causing premature polymerization and gelling of the composition. There may also be pigment settling. This problem is especially annoying when such aforementioned prior compositions are packaged in aerosol spray cans as the slight gelling causes malfunction of the aerosol cans.

SUMMARY OF THE INVENTION

This invention relates to primer compositions comprising film-forming acrylic or methacrylic polymer with adhesion promoting pendant oxazolidine groups, zinc chromate, and stabilizer having the structure

wherein
R and $R_1$ are each selected from the group consisting of -H, alkyl of one to four carbons and alkanol of one to four carbons, and
$R_2$ is selected from the group consisting of -H, -OH, alkyl of one to eight carbons, alkanol of one to four carbons, $-(CH_2)_nNH_2$ where $n$ is 2 to 6 and $-(CH_2CH_2NH)_mCH_2CH_2NH_2$ where $m$ is 1 to 3.
This amino compound tends to inhibit reaction between zinc chromate and the pendant oxazolidine groups on the film-forming polymer.

In primer compositions intended to dry in air R and $R_1$ are preferably H or $CH_3$ with $R_2$ being $-CH_2CH_2OH$, whereas primers which are to be baked can tolerate a higher molecular weight dialkylaminoalkanol. Suitable amino compounds are ethyl amine,
diethyl amine,
triethyl amine,
monoethanol amine,
diethanol amine,
triethanol amine,
N-methyl ethanolamine,
2-diethylaminoethanol,
ethylene diamine,
tetraethylene pentamine,
triethylene diamine,
monoisopropanolamine,
diethyl hydroxylamine,
ammonia,
dimethylamino propylamine, and
2-ethylhexyl amine with 2-dimethylaminoethanol being preferred.

The amount of the amino compound should be from 50 to 400 mole percent, preferably about 200 mole percent based on the moles of pendent oxazolidine adhesion promoting units present in the primer. For example, when the acrylic or methacrylic polymer contains units of 2-methacryloxyethyl-2,2-spirocyclohexyl oxazolidine the amino compound is added in an amount of between 50 and 400 mole percent based on the moles of the 2-methacryloxyethyl-2,2-spirocyclohexyl oxazolidine units in the polymer. The acryloxyalkyl oxazolidines of U.S. Pat. No. 3,037,006 can also be used and such compounds are hereby incorporated by reference.

These oxazolidine adhesion promoting units are incorporated in the polymer along with $ZnCrO_4$ to promote adhesion to steel. However, the adhesion promoters tend to attach to the zinc in the pigment molecule thereby forming a complex. This complex tends to settle out of the primer and cause gelling and coagulation, impairing the use of such a primer when packaged in aerosol containers.

It is theorized that the nitrogen of the amino compound preferentially reacts with the zinc in the pigment and thereby forms a soluble complex. Since the reaction between the amino compound and zinc is preferred over the reaction between zinc and the reaction nitrogen of the adhesion promoter, gelling or coagulation is hindered.

Upon application of the primer by spraying, the amino compound may be chosen so as to volatilize thereby allowing the zinc/N-hydroxyalkyloxazolidine reaction to occur. This reaction enhances the curing and adhesion of the primer to the substrate to which it is applied.

Within the range of amino compounds provided by the formula and at the same molar concentration as in the formulation of Example 1, different amino compounds have different beneficial results. 2-dimethylaminoethanol is preferred in that it provides excellent viscosity stability of the primer (no gelling) as shown in the example and also provides for maintenance of pigment dispersion as shown in the example. Also providing a good balance of viscosity stability and pigment dispersion at both high concentrations and when diluted 1/1 by volume with aerosol solvent as set forth in Example 1 are diethyl amine, triethylene diamine, ammonia and diethylaminopropyl amine.

Other compounds such as ethyl amine and ethylene diamine and diethylhydroxyl amine provide for good viscosity stability and improved pigment dispersibility at high concentrations without substantially enhancing pigment dispersion at spray concentrations. Such compound would preferably be used in a concentrated formulation or under conditions where substantial agitation before spraying is feasible. Triethyl amine provides for good maintenance of pigment dispersion in concentrated solution without substantially improving viscosity stability of the primer or pigment dispersibility in dilute solutions. Thus the beneficial effects it provides would be used to best advantage where shorter storage periods are required. Monoethanol amine, diethanol amine and monoisopropanol amine each provide for enhanced viscosity stability without substantially improving pigment dispersibility. These would be most suitably used where substantial agitation was available before spraying was feasible.

Accordingly, based on the above, addition of amino compound as herein defined assists in stabilizing the primer composition through improved viscosity stability, maintenance of pigment dispersal in concentrated solution, or at spray viscosity, or combinations of these features.

PREPARATION

The amino stabilizers used in this invention can be added to the primer composition of this invention at any time during or after its preparation. Simply admixing the stabilizers at room temperature is sufficient.

The primer compositions of this invention have enhanced viscosity stability, or improved maintenance of pigment dispersion over these same compositions without the amine. They are useful as primers for steel. The primer compositions can be packaged in aerosol cans and preferred compositions are particularly suited to this use. Theoretically the amino stabilizers can be chosen to volatilize upon exposure to the atmosphere and thereby cease to inhibit the ZnCrO₄ oxazolidine reaction thereby allowing normal curing of the primer.

DESCRIPTION OF THE PREFERRED EMBODIMENTS

The following example illustrates the various aspects of the invention in greater detail. However, it should be recognized that they are only illustrative. Variations from what is disclosed will undoubtedly occur to those skilled in the art, but will nevertheless be embraced by the inventive concept of the invention. All parts unless otherwise indicated are by weight.

EXAMPLE 1

A pigment base slurry was prepared by admixing 14.72 parts of an acrylic copolymer having a 95-5 by weight ratio of methylmethacrylate/2-methacryloxyethyl-2,2-spirocyclohexyloxazolidine, respectively, at 40 percent solids, 3.71 parts of TiO₂, 17.50 parts of low micron talc, 15.54 parts of aluminum silicate, 9.43 parts of zinc chromate, 0.31 part of mollaco black pigment. This mixture was roll milled for 16 hours and then admixed with an additional 14.81 parts of the aforementioned acrylic copolymer and 1.96 parts of toluene. A paint was prepared from the aforementioned mill base by admixing 2024 grams of said mill base, 1040 grams of a Lucite acrylic polymethyl methacrylate resin at 40 percent solids, 295 grams of butylbenzylphthalate, 89 grams of acetone, 241 grams of a 7 percent Bentone gelling agent, 272 grams of toluene, 184 grams of acetone. To 800 grams of this paint were added 1.52 grams of 2-dimethylaminoethanol and the resultant mixture stirred for 30 minutes. This mixture was then tested for viscosity increase over a 5-week storage period at 120° F. [1]

Registered trademark of E. I. du Pont de Nemours & Company. [2] Registered trademark of National Lead Company.

Another sample of the paint was tested excepting this paint did not include the 1.52 grams of 2-dimethylaminoethanol. Both samples had an initial viscosity of 76 Krebs units. However, the paint which had 2-dimethylaminoethanol had a viscosity after 5 weeks storage at 120° F. of only 85 Krebs units whereas under the same conditions the untreated paint had a viscosity of 111 Krebs units.

Additional samples of the paint were prepared including 1.52 g. of 2-dimethylaminoethanol whereas the other was lacking any 2-dimethylaminoethanol. These two samples were then tested for pigment settling. After both were diluted with an aerosol solvent, which comprised 44.5 percent toluene, 20.9 percent isopropyl alcohol, 33.4 percent methyl ethyl ketone and 1.2 percent water. The two paint samples were diluted in a 1 to 1 ratio of paint to aerosol solvent by volume. These samples were then subjected to an accelerated storage test at 120° F. After 1 week the control sample, i.e., the sample having no 2-dimethylaminoethanol, displayed a tough gummy pigment deposit which was difficult to disperse and impossible to spray. The analog containing 2-dimethylaminoethanol was in perfect condition even after 17 days of heated storage. The analog made an excellent primer capable of being aerosol sprayed.

I claim:

1. In a composition comprising at least one member of the group consisting of film-forming acrylic polymers and methacrylic polymers having acryloxyalkyloxazolidine adhesion promoting monomeric units dissolved in an organic solvent also containing an adhesion promoting amount of ZnCrO₄, the improvement wherein the composition contains 50 to 400 mole percent based on the moles of oxazolidine adhesion promoting monomeric units of a stabilizer having the general structure:

wherein

R and R₁ are each selected from the group consisting of -H, alkyl of one to four carbons and alkanol of one to four carbons, and R₂ is selected from the group consisting of -H, -OH, alkyl of one to eight carbons, alkanol of one to four carbons, -(CH₂)$_n$NH₂ where $n$ is 2 to 6 and -(CH₂CH₂NH)$_m$CH₂CH₂NH₂ where $m$ is 1 to 3.

2. The composition of claim 1 wherein the adhesion promoting units in the acrylic or methacrylic polymers is 2-methacryloxyethyl-2,2-spirocyclohexyl oxazolidine.

3. The composition of claim 1 wherein acrylic polymer is a methyl methacrylate polymer of film-forming molecular weight.

4. The composition of claim 3 wherein the adhesion promoting monomeric units are present in an amount up to 5 percent by weight of the polymer.

5. The composition of claim 1 wherein stabilizer is selected from the group consisting of diethyl amine, triethyl amine, diethanol amine, 2-diethylaminoethanol and dimethylamino propylamine.

6. The composition of claim 2 wherein stabilizer is selected from the group consisting of diethyl amine, triethyl amine, diethanol amine, 2-diethylaminoethanol and dimethylamino propylamine.

7. The composition of claim 3 wherein stabilizer is selected from the group consisting of diethyl amine, triethyl amine, diethanol amine, 2-diethylaminoethanol and dimethylamino propylamine.

8. The composition of claim 3 wherein stabilizer is 2-diethylaminoethanol.

9. The composition of claim 5 wherein stabilizer is 2-diethylaminoethanol.

10. The composition of claim 4 wherein stabilizer is present in a molar amount of about 200 mole percent based on the moles of adhesion promoting monomeric units.

11. The composition of claim 9 wherein stabilizer is present in a molar amount of about 200 mole percent based on the moles of adhesion promoting monomeric units.

* * * * *